UNITED STATES PATENT OFFICE.

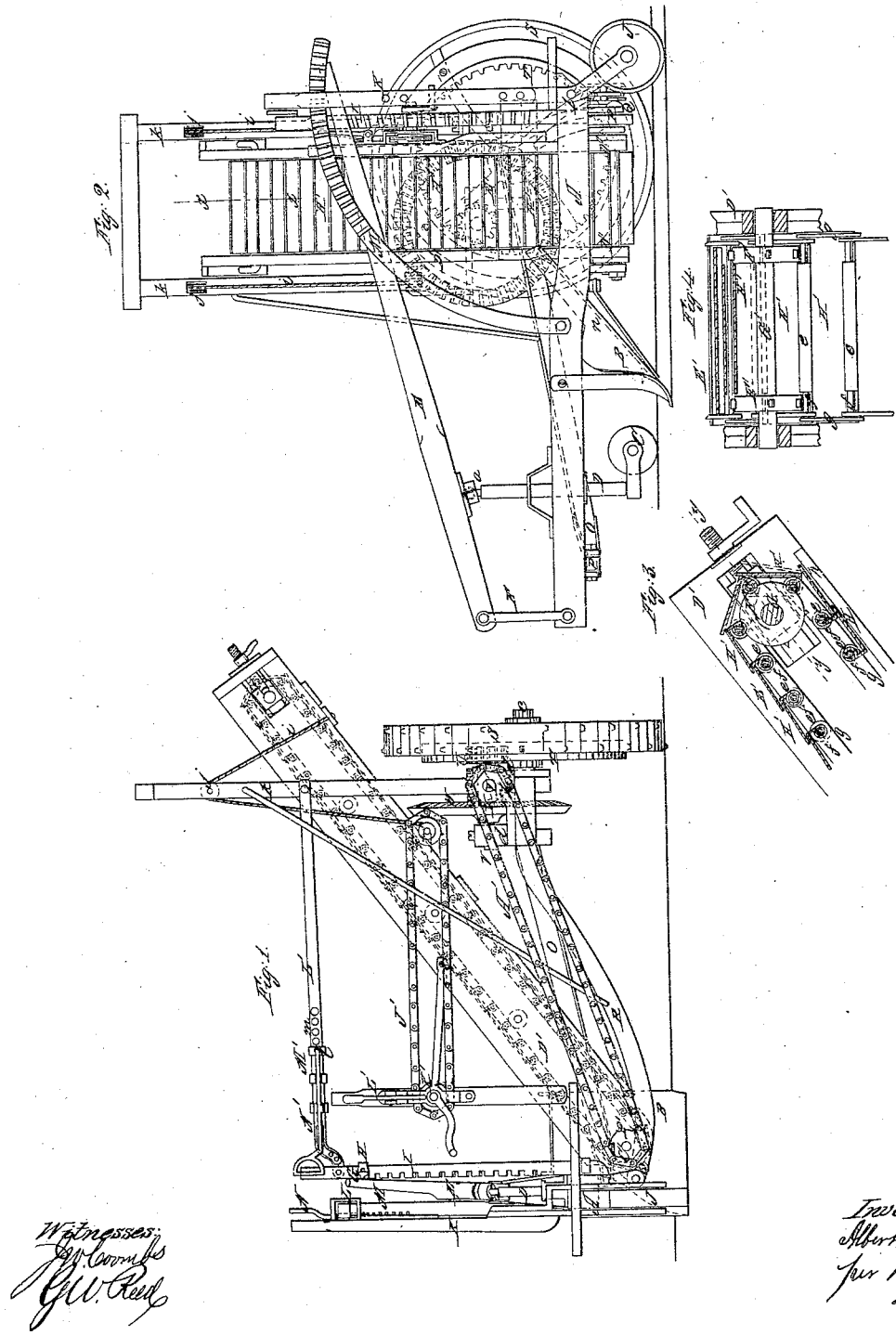

ALBERT KEITH, OF LISBON, ILLINOIS.

IMPROVEMENT IN GRADING AND EXCAVATING MACHINES.

Specification forming part of Letters Patent No. 34,256, dated January 28, 1862.

*To all whom it may concern:*

Be it known that I, ALBERT KEITH, of Lisbon, in the county of Kendall and State of Illinois, have invented a new and Improved Grading and Excavating Machine; and I do hereby declare that the following is a full, clear, and exact description of the same, reference being had to the accompanying drawings, making a part of this specification, in which—

Figure 1 is a back view of my invention in elevation; Fig. 2, a side elevation of the same; Fig. 3, a detached longitudinal section of the upper part of the endless apron pertaining to the same, taken in the line $x$ $x$, Fig. 2; Fig. 4, a section of Fig. 3, taken in the line $y$ $y$.

Similar letters of reference indicate corresponding parts in the several figures.

This invention relates to certain improvements in that class of grading and excavating machines in which a cutter or share is used in connection with an endless conveying-apron for conveying the earth to a wagon or cart accompanying the machine or for depositing the earth in ridges by the side of the excavation.

The object of the invention is to render the cutter or share adjustable in such a manner that it may always be made to work in a perfectly horizontal position in a transverse direction however much inclined the surface of the ground may be over which the machine is passing.

The invention has also for its object the constructing of the endless conveying-apron in such a manner that the earth will be readily discharged from it, and also so arranging the cutter or share beam that the cutter may be made to penetrate the earth at a greater or less distance, as may be required, and the cutter or share beam rendered capable of being adjusted horizontally in a longitudinal direction.

To enable those skilled in the art to fully understand and construct my invention, I will proceed to describe it.

A represents a beam, to which the cutter or share B is attached. This beam may be of wood, and it is supported at its front end by a caster-wheel C, which is at the lower end of a vertical rod D, that passes loosely through the beam, and is connected at its upper end by a ball-and-socket joint $a$ to a lever E, the front end of which is connected by a link F to the front end of the beam A. The back end of the lever E is provided with a catch or fastening G and a loop or guide H, the latter being simply a square loop or staple, which is fitted on an upright notched bar I into any of the notches of which the catch G may fit, and thereby retain the back part of said lever at any desired height. This adjustment of the lever E admits of the front part of the beam A being adjusted higher or lower, as may be desired.

The back part of the beam A is supported by a wheel J, which is secured to the lower end of a lever K, that is attached to the beam A by a fulcrum-pin $b$. The upper end of this lever K is provided with a loop or guide L, which is fitted on a notched segment-bar M, attached to the beam A, the upper part of said lever being provided with a catch N to retain the lever K at any desired point of its movement. By adjusting this lever K the back end of the beam A may be retained or supported at any desired height.

The beam A near its front end is connected to an oblique or diagonal bar O by a joint or hinge P, and the back part of said beam is connected by a similar joint or hinge Q to an oblique bar R, which may be of metal. The two bars O R are connected at their outer ends, the latter bar R being provided with an arm $c$, on which a wheel S is fitted. The wheel S supports the outer ends of the bars O R, and it has a concentric toothed wheel T attached to it, into which a pinion U gears, said pinion being on a shaft V, the bearings of which are on arms $d$ $d$, attached to the bar R. On the shaft V there is placed a bevel-wheel W, which gears into a bevel-pinion X on a shaft Y, the bearings of which are on the outer arm $d$. On the outer end of the shaft Y there is fitted a pulley Z, which is provided with teeth at its periphery, and around which an endless chain A′ passes, said chain also passing around a pulley B′, which is on a shaft C′ at the lower end of a box D′. The shaft C′ has two wheels or pulleys D″ D″, around which an endless apron E′ passes, the upper end of said apron passing around wheels or pulleys F′ F′ on a shaft G′ in the upper part of the box D′. The lower part of the box D′ is attached to the beam A by hinges or joints.

The apron E' is formed of a series of transverse plates H', which are connected by eyes or loops e to rods f, the ends of which are attached to chains g g. The rods f rest or bear on the pulleys D' F', and the plates H' are allowed to work a trifle on the rods f, so that each plate as it turns on the upper pulleys F' F' will be thrown a little outward at its outer part and by said movement effectually discharge the dirt from it. This will be fully understood by referring to Fig. 3, in which the outward position of one of the plates H' is shown by dotted lines. The plates H' are held in proper position while passing downward to the lower part of the box D' by longitudinal strips h. (Shown in Fig. 3.)

The box D' may be adjusted in a more or less inclined position by means of cords i i, which are attached one to each side of the box D', pass over pulleys j j in uprights k k, and are attached to a shaft I', which is turned through the medium or an endless chain J'. (Shown in Fig. 1.) The operating-pulley K' of the endless chain J' is provided with a catch L', by which the box D', and consequently the apron E', may be retained at any desired point in its movement.

To one of the uprights k there is attached a horizontal perforated bar L', and on this bar L' there is fitted a slide M', which is screwed to the upper end of the notched upright bar I. The slide M' has a lever N' attached to it, said lever being provided with a pin l, which may be fitted in any one of the perforations m of the bar L'. By adjusting the slide M' the beam A, it will be seen, may be kept in a perfectly horizontal position in a transverse direction, however much the other parts of the machine may be inclined in said direction.

The cutter or share B has an inclined position and is provided with sides n. The cutter or share may be described as being of scoop form, its bottom o being a plane with a front cutting-edge, the sides n n extending upward from the bottom o.

As the machine is drawn along the cutter or share B may be made to penetrate the earth at a greater or less depth by adjusting the beam A higher or lower by means of the levers E K, as previously described. The earth passes up through the cutter or share B, and is discharged on the lower part of the endless apron E', by which it is conveyed and discharged at the upper end of box D', the apron E' being driven through the medium of the gearing T U W X and endless chain A'. The plates H' discharge the earth from them as they pass around the upper pulleys F' F', as previously described, and the cutter or share B is always kept in a horizontal position in a transverse direction by adjusting the slide M'.

I am aware that inclined endless aprons have been used in connection with cutters or shares for excavating, grading, and like purposes; but I am not aware that endless aprons have been constructed with metal plates arranged, as herein shown, for the purpose of effectually discharging the earth; neither am I aware that a cutter or share beam has ever been arranged so as to be capable of being adjusted as herein described.

I claim, therefore, as new and desire to secure by Letters Patent—

1. Constructing the endless apron E' of a series of metal plates H', attached to rods f, the ends of which are connected to chains g g, and all arranged, as shown, to admit of a certain degree of tilting of the plates H' as they pass around the pulleys F', as and for the purpose set forth.

2. Attaching the beam A to the oblique bars O R by means of joints or hinges P Q, in connection with the adjustable slide M', fitted on the perforated bar L', provided with a catch or lever N' and attached to the upright notched bar I, all being arranged, as shown, to admit of the adjustment of the beam A and cutter or share B in a transverse direction, as set forth.

3. Supporting the front part of the beam A by means of a caster-wheel C, connected with an adjustable lever E', in combination with the wheel J, which supports the back part of the beam A and is connected with the adjustable lever K, all arranged as and for the purpose specified.

ALBERT KEITH.

Witnesses:
A. Z. TAYLOR,
CHARLES FARWELL.